(12) United States Patent
Harada et al.

(10) Patent No.: US 11,871,452 B2
(45) Date of Patent: Jan. 9, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP); Shohei Yoshioka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 342 days.

(21) Appl. No.: 17/292,142

(22) PCT Filed: Nov. 9, 2018

(86) PCT No.: PCT/JP2018/041718
§ 371 (c)(1),
(2) Date: May 7, 2021

(87) PCT Pub. No.: WO2020/095449
PCT Pub. Date: May 14, 2020

(65) Prior Publication Data
US 2021/0400725 A1 Dec. 23, 2021

(51) Int. Cl.
*H04W 74/08* (2009.01)
*H04L 5/00* (2006.01)
*H04W 74/00* (2009.01)

(52) U.S. Cl.
CPC ....... *H04W 74/0816* (2013.01); *H04L 5/0051* (2013.01); *H04W 74/006* (2013.01); *H04W 74/0891* (2013.01)

(58) Field of Classification Search
None
See application file for complete search history.

(56) References Cited

U.S. PATENT DOCUMENTS

| 10,581,571 | B2* | 3/2020 | Kim | H04L 5/0091 |
| 11,432,344 | B2* | 8/2022 | Zhang | H04L 5/0053 |
| 11,558,833 | B2* | 1/2023 | Wang | H04W 56/001 |
| 11,595,839 | B2* | 2/2023 | Kim | H04L 5/0023 |
| 11,606,764 | B2* | 3/2023 | Noh | H04W 56/001 |
| 11,617,141 | B2* | 3/2023 | Jung | H04W 56/0015 370/350 |

(Continued)

FOREIGN PATENT DOCUMENTS

| EP | 3738361 A1 | 11/2020 |
| EP | 3979544 A1 | 4/2022 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Faiyazkhan Ghafoerkhan
(74) *Attorney, Agent, or Firm* — Osha Bergman Watanabe & Burton LLP

(57) ABSTRACT

In order to perform appropriate communication in an unlicensed band, a user terminal according to one aspect of the present disclosure includes a receiving section that receives at least one of a synchronization signal block and a reference signal for measurement in a given duration of a frequency domain to which listening is applied, and a control section that controls reception of a physical downlink channel based on a transmission candidate position of at least one of the synchronization signal block and the reference signal for measurement when the physical downlink channel is received in the given duration.

7 Claims, 10 Drawing Sheets

(56) References Cited

U.S. PATENT DOCUMENTS

| | | | |
|---|---|---|---|
| 2018/0302203 A1* | 10/2018 | Kim | H04J 11/00 |
| 2019/0246410 A1* | 8/2019 | Zhang | H04W 72/0446 |
| 2020/0053670 A1* | 2/2020 | Jung | H04W 56/00 |
| 2020/0413356 A1* | 12/2020 | Wang | H04W 72/046 |
| 2021/0185737 A1* | 6/2021 | Zhang | H04W 28/18 |
| 2021/0212002 A1* | 7/2021 | Jung | H04W 56/00 |
| 2021/0297966 A1* | 9/2021 | Noh | H04L 27/2602 |
| 2021/0345406 A1* | 11/2021 | Myung | H04L 5/0044 |
| 2021/0400725 A1* | 12/2021 | Harada | H04L 5/0048 |

FOREIGN PATENT DOCUMENTS

| | | |
|---|---|---|
| JP | 201722539 A | 1/2017 |
| WO | 2017051726 A1 | 3/2017 |

OTHER PUBLICATIONS

International Search Report issued in International Application No. PCT/JP2018/041718, dated Jan. 22, 2019 (3 pages).
Extended European Search Report issued in European Application No. 18939524.7, dated Jun. 7, 2022 (9 pages).
Office Action issued in European Application No. 18939524.7, dated May 3, 2023 (7 pages).
Office Action issued in Chinese Application No. 201880100606.9, dated May 12, 2023 (15 pages).
Huawei et al.; "Initial access in NR unlicensed"; 3GPP TSG RAN WG1 Meeting #93, R1-1805920; Busan, Korea; May 21-May 25, 2018 (6 pages).

* cited by examiner

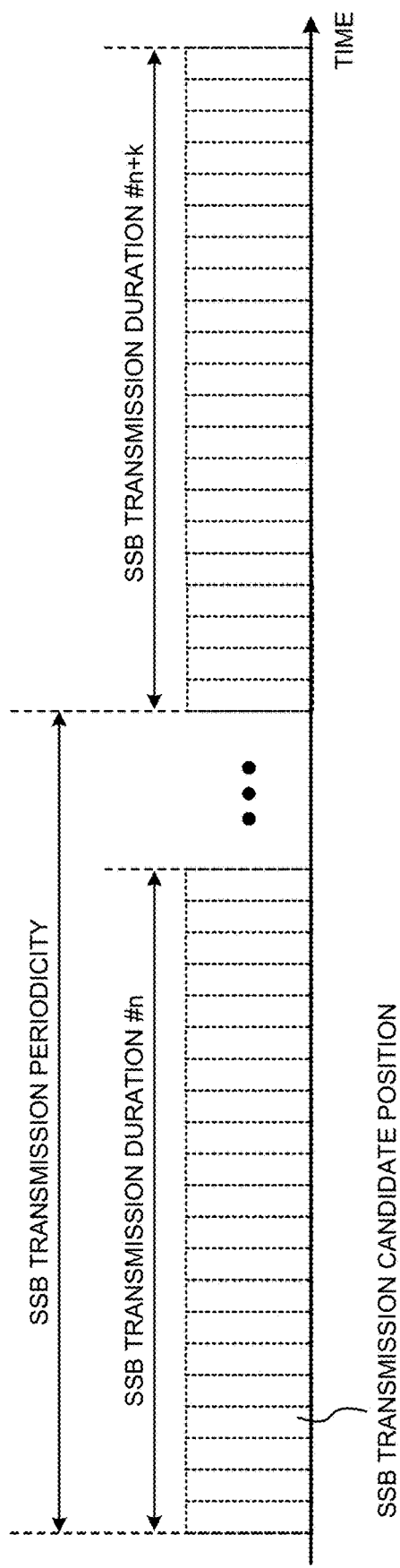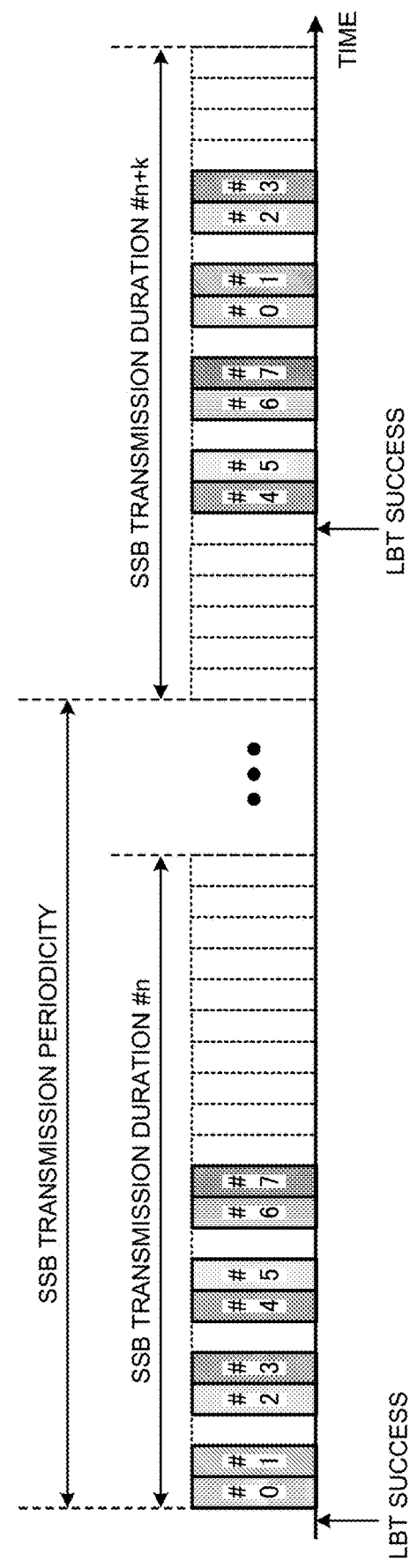

USER TERMINAL AND RADIO COMMUNICATION METHOD

TECHNICAL FIELD

The present disclosure relates to a user terminal and a radio communication method in a next-generation mobile communication system.

BACKGROUND ART

In the universal mobile telecommunications system (UMTS) network, long term evolution (LTE) has been specified for the purpose of further increasing a data rate, providing low latency, and the like (see Non Patent Literature 1). In addition, LTE-Advanced (third generation partnership project (3GPP) Rel. (Release) 10-14) has been specified for the purpose of further increasing capacity and sophistication of LTE (3GPP Rel. 8 and 9).

In existing LTE systems (for example, Rel. 8 to 12), the specifications have been drafted assuming that exclusive operation is performed in a frequency band licensed to a telecommunications carrier (operator) (also referred to as a "licensed band", a "licensed carrier", a "licensed component carrier (CC)", and so on). As the licensed CC, for example, 800 MHz, 1.7 GHz, 2 GHz, etc. are used.

Further, in the existing LTE system (for example, Rel. 13), in order to extend the frequency band, a frequency band different from the above licensed band (also referred to as an "unlicensed band", an "unlicensed carrier", or an "unlicensed CC") is supported. As the unlicensed band, for example, 2.4 GHz band or 5 GHz band in which Wi-Fi (registered trademark) or Bluetooth (registered trademark) can be used is assumed.

Specifically, in Rel. 13, carrier aggregation (CA) that integrates a carrier (CC) in the licensed band and a carrier (CC) in the unlicensed band is supported. The communication performed using the unlicensed band together with the licensed band is called LAA (License-Assisted Access).

Use of the LAA is being studied also in future radio communication systems (for example, 5th generation mobile communication system (5G), 5G+ (plus), new radio (NR), or 3GPP Rel. 15 or later versions). In the future, it is possible that use of LAA will be considered also in dual connectivity (DC) between the licensed band and the unlicensed band or stand-alone (SA) of the unlicensed band.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the future radio communication systems (for example, 5G, 5G+, NR, and Rel. 15 or later versions), a transmitting apparatus (for example, a base station in the downlink (DL), a user terminal in the uplink (UL)) performs listening (also referred to as "LBT (Listen Before Talk)", "CCA (Clear Channel Assessment)", "carrier sensing", "sensing", "channel access procedure", and so on) for confirming the presence or absence of transmission of other pieces of apparatus (for example, base station, user terminal, Wi-Fi device, and so on) before transmission of data in the unlicensed band.

In order for such a radio communication system to coexist with other systems in the unlicensed band, it is conceivable that the radio communication system complies with a listen before talk (LBT) regulation in the unlicensed band.

However, if an operation in the unlicensed band is not clearly determined, there is a risk that appropriate communication cannot be performed in the unlicensed band, for example, an operation in a specific communication situation does not conform to the LBT regulation or utilization efficiency of radio resources is reduced.

Therefore, one of objects of the present disclosure is to provide a user terminal and a radio communication method for performing appropriate communication in an unlicensed band.

Solution to Problem

In accordance with one aspect of the present disclosure, a user terminal includes a receiving section that receives at least one of a synchronization signal block and a reference signal for measurement in a given duration of a frequency domain to which listening is applied, and a control section that controls reception of a physical downlink channel based on a transmission candidate position of at least one of the synchronization signal block and the reference signal for measurement when the physical downlink channel is received in the given duration.

Advantageous Effects of Invention

According to one aspect of the present disclosure, appropriate communication can be performed in an unlicensed band.

BRIEF DESCRIPTION OF DRAWINGS

FIG. 3A and FIG. 3B are diagrams illustrating an example of a case of configuring an SSB transmission candidate position.

DESCRIPTION OF EMBODIMENTS

<Collision Avoidance Method in Unlicensed Band>

Figure 1A:
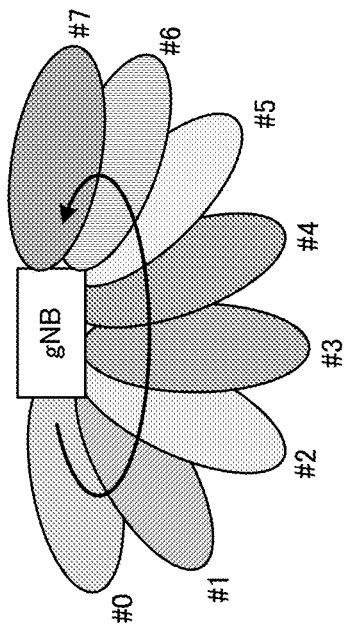
FIGS. 1A and 1B are diagrams illustrating an example of a transmission method of SSB.

In the unlicensed band (for example, 2.4 GHz band or 5 GHz band), it is assumed that a plurality of systems such as a Wi-Fi system and a system supporting LAA (LAA system) coexist. Therefore, it is necessary to avoid collision of transmissions and/or control interference between the plurality of systems.

For example, a Wi-Fi system using an unlicensed band employs CSMA (Carrier Sense Multiple Access)/CA (Collision Avoidance) for the purpose of collision avoidance and/or interference control. In the CSMA/CA, a given time (DIFS (Distributed access Inter Frame Space)) is provided before transmission, and a transmitting apparatus transmits data after confirming that there is no other transmission signal (carrier sense). After transmitting the data, the transmitting apparatus waits for ACK (ACKnowledgement) from a receiving apparatus. If the transmitting apparatus cannot receive the ACK within the given time, the transmitting apparatus determines that a collision has occurred and performs retransmission.

In addition, in the Wi-Fi system, for the purpose of collision avoidance and/or interference control, RTS/CTS is employed in which a transmission request (RTS (Request to Send)) is transmitted before transmission, and if the receiving apparatus can receive it, it responds as being receivable (CTS (Clear to Send). For example, RTS/CTS is effective in avoiding data collisions due to hidden terminals.

Incidentally, in LAA of the existing LTE system (for example, Rel. 13), data transmitting apparatus performs listening (also referred to as "LBT", "CCA", "carrier sense", "channel access procedure", and so on) for confirming the presence or absence of transmission of other pieces of apparatus (for example, base station, user terminal, Wi-Fi device, and so on) before transmission of data in the unlicensed band.

The transmitting apparatus may be, for example, a base station (for example, gNB (gNodeB)) in the downlink (DL) and a user terminal (for example, UE (User Equipment)) in the uplink (UL). Further, the receiving apparatus that receives data from the transmitting apparatus may be, for example, a user terminal in DL and a base station in UL.

In the LAA of the existing LTE system, the transmitting apparatus starts data transmission after a given period (for example, immediately or a backoff period) after it is detected that there is no transmission of other pieces of apparatus in the listening (idle state).

Also in future LAA systems (for example, Rel. 15 or later versions, also referred to as 5G, 5G+, NR, etc.), it is assumed that the transmitting apparatus performs listening before transmitting a signal in a given frequency domain (for example, an unlicensed band) and controls a transmission start based on a result of the listening (for example, LBT).

Incidentally, in future radio communication systems, it is being studied to define a resource unit including a synchronization signal and a broadcast channel as a synchronization signal (SS) block and perform initial connection or measurement based on the SS block. The synchronization signal is also referred to as PSS and/or SSS, NR-PSS and/or NR-SSS, or the like. The broadcast channel is also referred to as PBCH, NR-PBCH, or the like. The synchronization signal block is also referred to as an SS block (SSB), an SS/PBCH block, or the like.

The SS/PBCH block is composed of one or more symbols (for example, OFDM symbols). Specifically, the SS/PBCH block may be composed of a plurality of consecutive symbols (for example, four symbols). Within the SS/PBCH block, PSS, SSS, and NR-PBCH may be arranged in one or more different symbols, respectively. As an example, the SS/PBCH block may be composed of four symbols including one symbol of PSS, one symbol of SSS, and two symbols of PBCH.

Figure 1B:
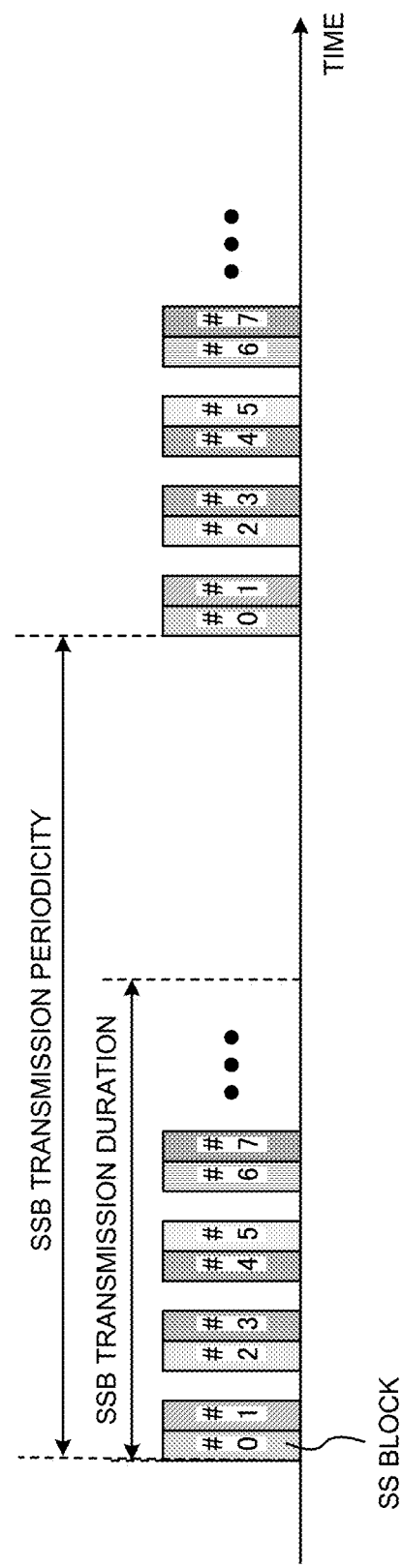

FIG. 1 is a diagram illustrating an example of a transmission method of SSB. FIG. 1A illustrates an example of beam sweeping. As illustrated in FIGS. 1A and 1B, a radio base station (for example, gNB) may make directivities of beams different in time (beam sweeping), and transmit different SS blocks using different beams. Note that an example using multiple beams is illustrated in FIGS. 1A and 1B, but it is also possible to transmit the SSB using a single beam.

As illustrated in FIG. 1B, the SSB is transmitted within a given period (duration) configured for each transmission cycle (periodicity) of the SSB, and one or more SSBs are configured within the given duration. For example, FIG. 1B illustrates a case where a plurality of SSB indexes (SSB #0 to #7) are transmitted within the given period (duration). The number of SSBs transmitted within the given period (duration) is not limited thereto. Further, SSB #0 to #7 may be transmitted by different beams #0 to #7 (FIG. 1A), respectively.

As illustrated in FIG. 1B, SSB #0 to #7 may be transmitted so as not to exceed a given duration (for example, 5 ms or less, also referred to as an SS burst set period or the like). Further, the given duration may be repeated in a given periodicity (for example, 5, 10, 20, 40, 80, or 160 ms, also referred to as an SS burst set periodicity or the like).

Note that in FIG. 1B, there is a given time interval between SSBs #1 and #2, between SSBs #3 and #4, and between SSBs #5 and #6, but the time interval may not be present and may be provided between other SS blocks (for example, between SS blocks #2 and #3 and between SS blocks #5 and #6). In the time interval, for example, a DL control channel (also referred to as PDCCH, NR-PDCCH, downlink control information (DCI), or the like) may be transmitted or a UL control channel (Physical Uplink Control Channel (PUCCH)) may be transmitted from a user terminal. For example, when each SSB is composed of four symbols, two symbols of PDCCH and two SS blocks, two symbols of PUCCH, and a guard time may be included in a slot of fourteen symbols.

In the initial connection using the SSB, an index of the SS block (SS block index) may be provided in notification to the UE using at least one of PBCH included in the SS block and DMRS (DeModulation Reference Signal) for the PBCH. The UE can grasp the SS block index of the received SS block based on the PBCH (or the DMRS for the PBCH).

MIB (Master Information Block) of MSI (Minimum System Information) read by the UE at the time of the initial connection is carried by the PBCH. The remaining MSI is RMSI (Remaining Minimum System Information), and corresponds to SIB (System Information Block) 1, SIB2, or the like in LTE. Further, the RMSI may also be scheduled by the PDCCH indicated by the MIB.

In NR, the SSB may be used for synchronization, cell detection, timing detection of a frame and/or a slot, and the like. A plurality of SSBs within the SSB transmission duration of a given duration (for example, 5 ms) may indicate the same cell ID. Each SSB may indicate a unique SSB index. The SSB index may be a configuration that determines a time position (transmission candidate position) of the SSB within the SSB transmission duration (a configuration in which a time resource and the SSB index are configured in association with each other).

The maximum number L of SSB that can be transmitted within one SSB transmission periodicity may be determined according to a frequency band. For example, L in a 0 to 3 GHz frequency band may be four, L in a 3 to 6 GHz frequency band may be eight, and L in a 6 to 52.6 GHz frequency band may be sixty-four. The SSB transmission duration may be configured to one of 5, 10, 20, 40, 80, and 160 ms.

Note that a frequency band lower than 6 GHz may be referred to as sub-6 or FR (Frequency Range) 1. A frequency band higher than 6 GHz may be referred to as above-6, FR2, a millimeter wave, or the like, or may refer to a frequency band higher than 24 GHz.

One SSB transmission duration (for example, 5 ms) is included in the SSB transmission periodicity. SSB transmission candidate positions (timings, time resources) within the SSB transmission duration may be defined by specifications. The SSB transmission duration may be a 5 ms half frame of the first half or the second half of a radio frame. For example, 64 SSB transmission candidate positions may be defined for a frequency band of 6 GHz or higher and a subcarrier spacing (SCS, numerology) of 120 kHz. The transmission candidate position of the SSB may be represented by an SSB index in a time direction.

The base station (network, gNB) may transmit an arbitrary number of SSBs of L or less in each SSB transmission priodicity. The base station may notify the UE of the SSB transmission periodicity using information provided in notification by SIB1 or higher layer signaling (for example, ssb-periodiciitySevringCell). Further, the base station may notify the UE of an actually transmitted SSB using a bitmap included in information (ssb-PositionsInBurst) provided in notification by SIB1 or higher layer signaling.

The UE is only required to be able to detect one SSB in synchronization, cell detection, timing detection of a frame and/or a slot, and the like. Meanwhile, the UE can perform rate matching, measurement, or the like with high accuracy by recognizing the actually transmitted SSB in the rate matching, the measurement, or the like.

Specifically, the UE assumes that only one transmittable position for each SSB index within the SSB transmission duration (for example, 5 ms) is configured, and receives the SSB based on the information notified from the base station (SSB transmission periodicity, SSB transmission position indicated by the bitmap, or the like).

Meanwhile, when transmission of the SSB is supported in a frequency domain to which listening (LBT) is applied (for example, an unlicensed band), a possibility that a transmission duration of the SSB will be reduced according to a listening result is conceivable. For example, in listening of DL, a case where LBT idle occurs in the middle of the SSB transmission duration is also assumed.

In such a case, DL transmission (for example, SSB transmission) is performed from the middle of the SSB transmission duration. When each SSB index is configured so as to correspond to one time resource in the SSB transmission duration, there is a risk that an SSB index that is not transmitted in the SSB transmission duration may occur according to a listening result (or a transmission starting position of the SSB).

Figure 2:
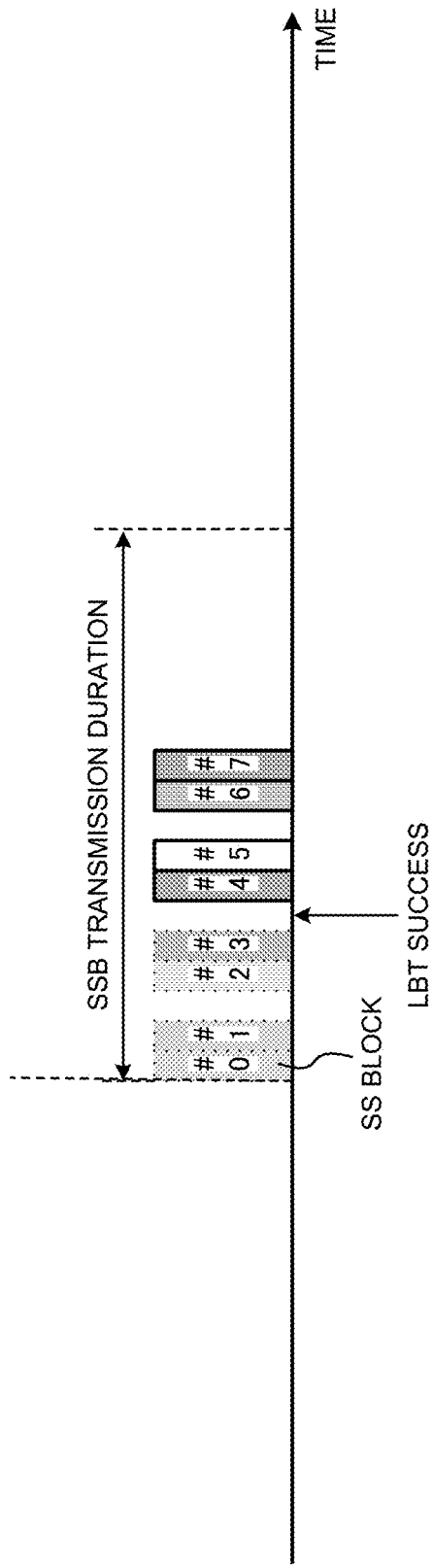
FIG. 2 is a diagram illustrating an example of transmission control of SSB according to a listening result.

FIG. 2 illustrates an example of a case where the listening result becomes LBT idle and the SSB is transmitted in the middle of the SSB transmission duration. Here, a case where LBT is busy and SSBs #0 to #3 are not transmitted at transmission timings of SSBs #0 to #3 is illustrated.

From the viewpoint of securing a transmission opportunity of SSB, it is conceivable to increase time resource positions where the SSB can be transmitted to make it possible to transmit the SSB at another location even in a case where transmission fails (for example, LBT busy) at a place where each SSB index is configured (original place).

For example, in a period in which the transmission of the SSB is allowed, it is conceivable to configure a plurality of positions rather than one position for transmission of each SSB index and flexibly perform transmission control of the SSB (for example, transmission position, transmission order, or the like) based on a listening result.

When the position where the SSB can be transmitted is expanded and configured as described above, a time resource in which the SSB is actually transmitted will be changed according to the listening result. In this case, the problem is how the UE performs reception control of the SSB in a given period in which the SSB can be transmitted. For example, when a physical downlink channel (for example, at least one of PDSCH and PDCCH) is transmitted in the given period, the problem is how to control reception processing (for example, rate matching processing or the like) of the physical downlink control channel in consideration of the transmission of the SSB.

The present inventors or the like have paid attention to the fact that transmission candidate positions of the SSB are configured in a given period in which the transmission of the SSB is supported, and have conceived to control reception processing of the physical downlink channel in consideration of the transmission candidate positions.

Hereinafter, embodiments according to the present disclosure will be described in detail with reference to the drawings. The radio communication method according to each of the embodiments may be applied independently, or may be applied in combination with others.

In the present disclosure, an unlicensed CC may be replaced with a carrier (cell, CC), LAA SCell, an LAA cell, a primary cell (PCell, Special Cell: SpCell), a secondary cell (SCell), and the like, in a first frequency band (unlicensed band, unlicensed spectrum). Further, a licensed CC may be replaced with a carrier (cell, CC), PCell, SCell, and the like, in a second frequency band (licensed band, licensed spectrum).

Further, in the present embodiment, the unlicensed CC may be NR-based (NR unlicensed CC) or LTE-based. Similarly, the licensed CC may be NR-based or LTE-based.

The radio communication system (NR-U, LAA system) may comply with (support) a first radio communication standard (for example, NR, LTE, or the like).

Other systems that coexist with this radio communication system (coexistence system, coexistence apparatus) and other radio communication devices (coexistence apparatus) may comply with (support) a second radio communication standard, which is different from the first radio communication standard, such as Wi-Fi, Bluetooth (registered trademark), WiGig (registered trademark), wireless LAN (Local Area Network), IEEE802.11, LPWA (Low Power Wide Area), etc. The coexistence system may be a system that receives interference from the radio communication system or a system that gives interference to the radio communication system. The coexistence system may support RTS and CTS, or equivalent transmission request signal and receivable signal.

Note that in the following description, SSB will be taken as an example, but the present embodiment can be applied to a DL signal other than the SSB. For example, the present embodiment may be applied to a DL reference signal for measurement (for example, it may be referred to as CSI-RS or DRS), in addition to the SSB. In this case, in the following description, the SSB and the DL reference signal (for example, CSI-RS, DRS, or the like) may be replaced with each other. Further, a case where a given number (for example, 8) of SSB indexes are provided in the SSB transmission duration is illustrated in the following description, but the number, an arrangement order, and the like of SSB indexes are not limited thereto.

(First Aspect)

A first aspect controls reception processing of DL in consideration of an SSB transmission candidate position configured in an SSB transmission duration in which transmission of SSB is supported.

<SSB Transmission Candidate Position>

In an SSB transmission duration, a transmission candidate position of SSB (SSB transmission candidate position) may be configured (see FIG. 3A). The SSB transmission candidate position may be referred to as an SSB transmission candidate area, an SSB transmission candidate time domain, or an SSB transmission candidate symbol. The SSB transmission duration may be a given duration defined in advance in specifications or may be a given duration configured by higher layer signaling (for example, RRC signaling, a broadcast signal, etc.) from the network (for example, the base station) to the UE.

Each SSB transmission candidate position (or an index of each SSB transmission candidate position) may be configured so as to correspond to a given SSB index. The SSB transmission candidate positions may be continuously configured or may be selectively configured in a given time domain. Information regarding the SSB transmission candidate positions may be defined in advance in specifications or may be configured using at least one of higher layer signaling and downlink control information from the base station to the UE. The information regarding the SSB transmission candidate positions may include at least one of information regarding the number of SSB transmission candidate positions configured in the SSB transmission period and information regarding an SSB index corresponding to each SSB transmission candidate position.

For example, the base station may notify the UE of a correspondence relation between each SSB transmission candidate position (or the index of the SSB transmission candidate position) and the SSB index by a bitmap. In this case, the base station may notify the UE of the number of transmission candidate positions that may be used and a bitmap of indexes of the transmission candidate positions using at least one of RRC signaling, system information (for example, SIB), and downlink control information, separately from a bitmap notification regarding the SSB index that is actually transmitted.

Further, in the SSB transmission duration (or the given duration), a plurality of SSB transmission candidate positions corresponding to each SSB index may be configured. As a result, even in a case where listening (for example, LBT) has been successful in the middle of the SSB transmission duration, it becomes possible to transmit an SSB index included in a period in which DL transmission is restricted within the SSB transmission duration (See FIG. 3B).

FIG. 3B illustrates a case where LBT is busy at transmission timings of SSBs #0 to #3 and LBT becomes idle before a transmission timing of SSB #4. In this case, it becomes possible to increase the transmission duration of the SSB by transmitting SSBs #0 to #3 at an SSB transmission candidate position configured in a transmission duration after LBT idle.

<Reception Processing of DL>

The UE may control reception processing of DL based on the SSB transmission candidate position. Reception processing of DL may be reception processing of at least one of a downlink shared channel (for example, PDSCH), a reference signal used for demodulation of the PDSCH (for example, DMRS for PDSCH), a downlink control channel (for example, PDCCH), and a reference signal used for demodulation of the PDCCH (DMRS for PDCCH). Alternatively, the reception processing of the DL may be reception processing of another DL channel or DL signal. In the following description, reception processing of PDSCH (or DMRS for PDSCH) will be taken as an example of the reception processing of the DL, but the reception processing of the DL is not limited thereto.

For example, when the UE receives an instruction to transmit SSB in a frequency carrier of a listening (or unlicensed band or NR-U) target, the UE performs the reception processing of the DL in consideration of the SSB transmission candidate position. When PDSCH is received (or PDSCH is scheduled) within a range of the SSB transmission duration, the UE performs the reception processing on the assumption that PDSCH (or DMRS for PDSCH) is not transmitted in a resource corresponding to the SSB transmission candidate position.

That is, the UE performs the reception processing on the assumption that PDSCH is not transmitted in the resource corresponding to the SSB transmission candidate position, regardless of whether or not the resource corresponding to the SSB transmission candidate position is actually used for transmission of the SSB. The reception processing may be rate matching processing. Alternatively, the reception processing may be puncture processing.

The resource corresponding to the SSB transmission candidate position may be a resource including the SSB transmission candidate position (for example, a resource block (RB), a physical resource block (PRB), a common resource block, or a resource element (RE)). Alternatively, the resource corresponding to the SSB transmission candidate position may be a time resource and a frequency resource used for transmission of the SSB.

Figure 4:
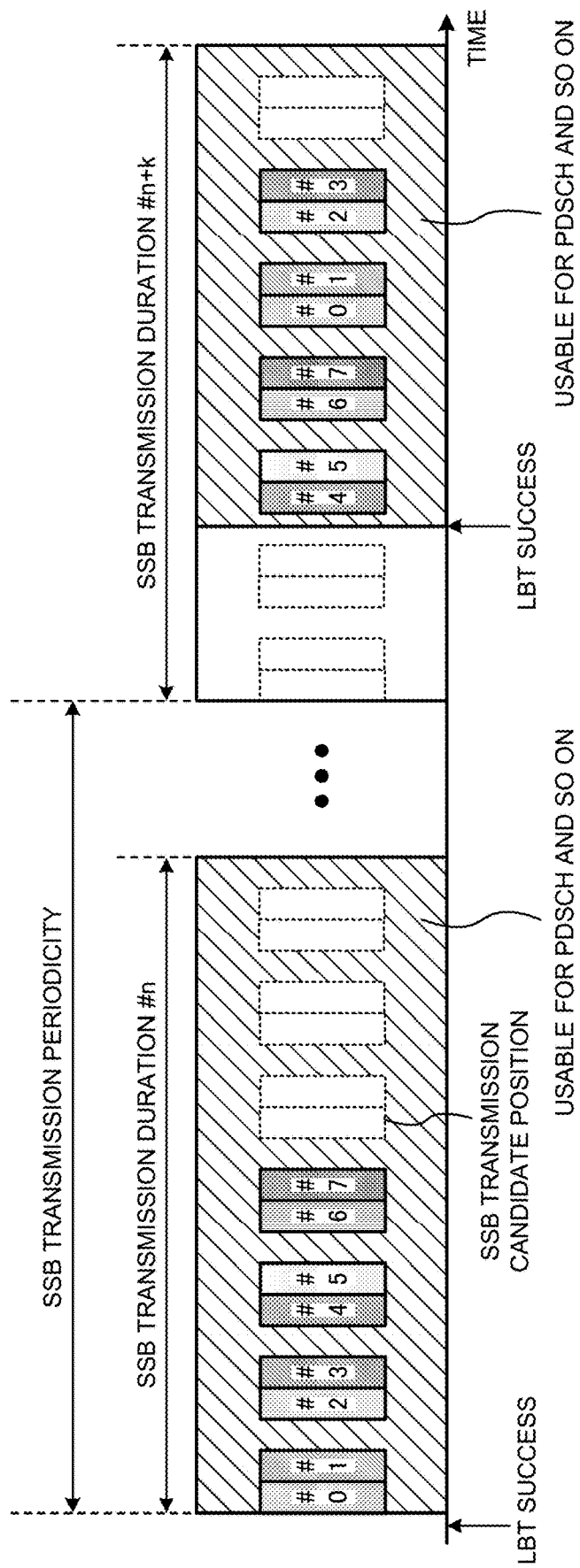
FIG. 4 is a diagram illustrating an example of transmission control of SSB according to a first aspect.

FIG. 4 illustrates an example of a case where rate matching processing is performed on the assumption that PDSCH and DMRS for the PDSCH are not transmitted (or SSB is transmitted) in the resource corresponding to the SSB transmission candidate position. In an SSB transmission duration #n1, a case where LBT becomes idle in a head area of an SSB transmission duration (or an area before a head SSB transmission candidate area) is illustrated. In this case, the UE performs reception processing on the assumption that PDSCH is not transmitted in the resource corresponding to the SSB transmission candidate position in the SSB transmission duration.

Note that the number of times by which each SSB index is actually transmitted in the SSB transmission duration may be a given number of times (for example, once) or less. In this case, an SSB transmission candidate area in which the SSB is not actually transmitted also occurs, but the UE may assume that PDSCH is not transmitted in all SSB transmission candidate areas regardless of whether or not the SSB is actually transmitted.

Further, in an SSB transmission duration #n1+k, a case where LBT becomes idle in the middle of an SSB transmission duration (area between an SSB transmission candidate area corresponding to SSB #3 and an SSB transmission candidate area corresponding to SSB #4) is illustrated. In this case, SSB transmission cannot be performed in SSB transmission candidate areas corresponding to SSBs #0 to #3 configured in the first half of the SSB transmission duration. For this reason, the base station transmits SSBs #0 to #3 using an SSB transmission candidate area of a period in which DL transmission is allowed after LBT idle (for example, COT (Channel occupancy time)).

The UE performs reception processing on the assumption that PDSCH is not transmitted in the resource corresponding to the SSB transmission candidate position in the SSB transmission duration after the LBT idle. Note that the number of times by which each SSB index is actually transmitted in the SSB transmission duration may be a given number of times (for example, once) or less. In this case, an SSB transmission candidate area in which the SSB is not actually transmitted also occurs, but the UE may assume that PDSCH is not transmitted in all SSB transmission candidate areas regardless of whether or not the SSB is actually transmitted.

As a result, the UE can apply the rate matching processing regardless of whether or not the SSB is actually transmitted, and it becomes thus possible to reduce a processing load of the UE (for example, rate matching operation or the like).

(Second Aspect)

A second aspect controls reception processing of DL in consideration of an SSB transmission candidate position where SSB is not transmitted (or SSB is actually transmitted) among SSB transmission candidate positions configured in an SSB transmission duration in which transmission of the SSB is supported.

For example, the UE performs the reception processing on the assumption that PDSCH (or DMRS for PDSCH) is transmitted in a first resource among resources corresponding to the SSB transmission candidate positions configured in the SSB transmission duration (or a given period). Alternatively, the UE performs the reception processing on the assumption that PDSCH (or DMRS for PDSCH) is not transmitted in a second resource among resources corresponding to the SSB transmission candidate positions configured in the SSB transmission duration.

For example, when the UE receives an instruction to transmit the SSB in a frequency carrier of a listening target, the UE determines a DL transmission starting position (or a transmission starting position of a serving cell, a COT starting position) in the SSB transmission duration. Then, the UE may perform rate matching processing on the assumption that PDSCH is not transmitted in a resource corresponding to an SSB transmission candidate position where the SSB can be actually transmitted in the SSB transmission duration after LBT idle. Alternatively, the UE assumes that PDSCH is not transmitted in a resource corresponding to an SSB transmission candidate position that has not yet been transmitted in the SSB transmission duration after LBT idle.

Figure 5:
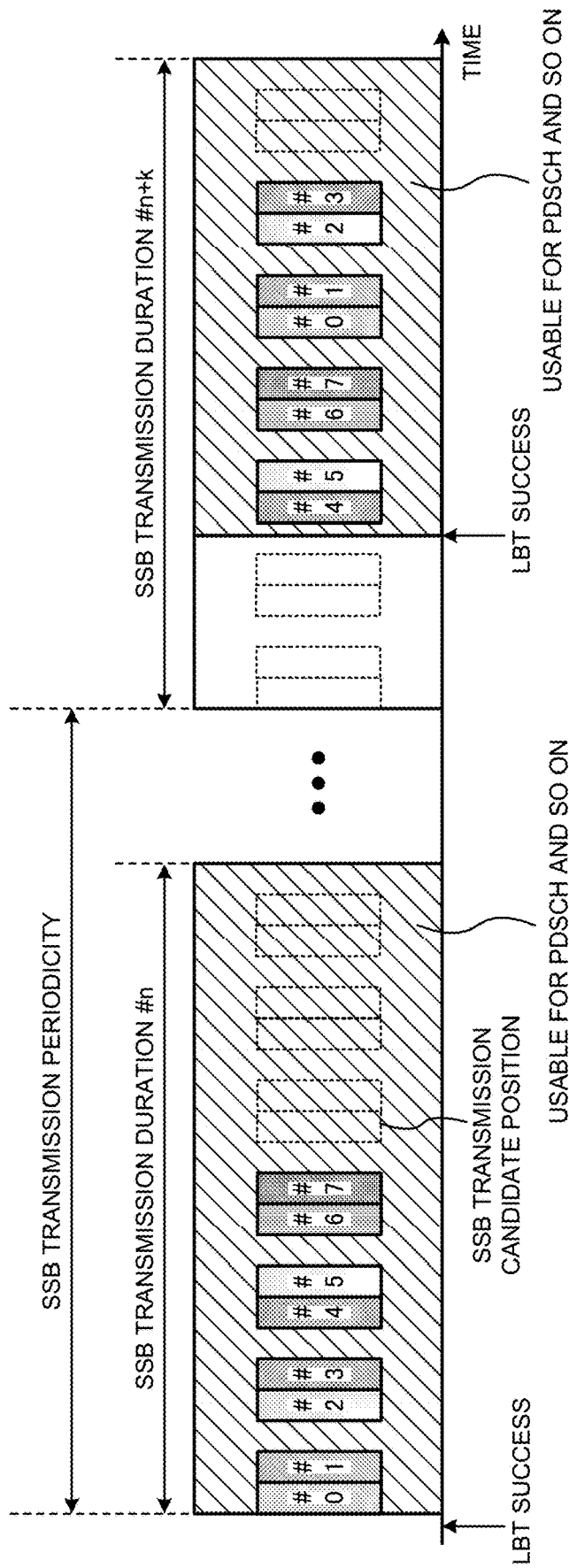
FIG. 5 is a diagram illustrating an example of transmission control of SSB according to a second aspect.

The base station performs listening before performing DL transmission (for example, SSB transmission) in a given frequency domain, and starts DL transmission when LBT is idle (see FIG. 5). The UE may recognize a DL transmission starting position (or LBT idle) in the SSB transmission duration based on the presence or absence of detection of a DL signal transmitted in the serving cell (or a given frequency domain). The DL signal transmitted by the serving cell may be, for example, a reference signal, given downlink control information, or the like.

Further, the UE may determine an SSB transmission starting position where the SSB is actually transmitted or an SSB transmission starting position where the SSB is not transmitted based on the DL transmission starting position and the SSB transmission candidate position configured in the SSB transmission duration after LBT idle. The SSB transmission candidate position where the SSB can actually be transmitted may be determined based on SSB indexes configured so as to correspond to each SSB transmission candidate position, the number of times by which each SSB is actually transmitted in the SSB transmission duration, and the like.

For example, it is assumed that the number of times by which each SSB index is actually transmitted is n (for example, n=1) or less in the SSB transmission duration. Note that n may be defined in advance in specifications or may be notified from the base station to the UE by higher layer signaling or the like.

In this case, the UE may assume that the SSB is actually transmitted at an SSB transmission candidate position allocated first among the SSB transmission candidate positions corresponding to each SSB index in the SSB transmission duration after the LBT idle. That is, when a plurality of SSB transmission candidate positions corresponding to the same SSB index are configured, the UE may assume that the SSB is transmitted at an SSB transmission candidate position configured first in a time direction and the SSB is not transmitted at an SSB transmission candidate position configured next.

In FIG. 5, in an SSB transmission duration #n1, a case where LBT becomes idle in a head area of an SSB transmission duration (or an area before a head SSB transmission candidate area) is illustrated. In this case, the UE determines that the SSB is actually transmitted at a resource (second resource) corresponding to the SSB transmission candidate position configured first in the time direction among the SSB transmission candidate positions corresponding to each SSB index. Further, the UE may determine that the SSB is not transmitted in a resource (first resource) corresponding to the SSB transmission candidate position configured after the second time in the time direction among the SSB transmission candidate positions corresponding to the same SSB index.

The UE performs reception processing on the assumption that PDSCH is not transmitted in a resource (second resource) corresponding to an SSB transmission candidate position where it has been assumed that the SSB is transmitted in the SSB transmission duration. On the other hand, the UE performs reception processing on the assumption that PDSCH is transmitted in a resource (first resource) corresponding to an SSB transmission candidate position where it has been assumed that the SSB is transmitted in the SSB transmission duration. As a result, the resource corresponding to the SSB transmission candidate position where the SSB is not transmitted can be used for transmission of PDSCH or the like, and utilization efficiency of resources can thus be improved.

Further, in an SSB transmission duration #n1+k, a case where LBT becomes idle in the middle of an SSB transmission duration (area between an SSB transmission candidate area corresponding to SSB #3 and an SSB transmission candidate area corresponding to SSB #4) is illustrated. In this case, SSB transmission cannot be performed in SSB transmission candidate areas corresponding to SSBs #0 to #3 configured in the first half of the SSB transmission duration. For this reason, the base station transmits SSBs #0 to #3 using an SSB transmission candidate area of a period in which DL transmission is allowed after LBT idle (for example, COT (Channel Occupancy Time)).

The UE is only required to determine that the SSB is actually transmitted at the resource (second resource) corresponding to the SSB transmission candidate position configured first in the time direction in the SSB transmission duration after the LBT idle and perform reception processing (for example, rate matching processing). As a result, the resource corresponding to the SSB transmission candidate position where the SSB is not transmitted can be used for transmission of PDSCH or the like, and utilization efficiency of resources can thus be improved.

Alternatively, the UE may perform reception processing on the assumption that the SSB is actually transmitted from a given number of SSB transmission candidate positions (eight SSB transmission candidate positions in FIG. 5) from the LBT idle (or COT starting position). That is, the UE may perform reception processing on the assumption that a resource corresponding to an SSB transmission candidate position after the given number of SSB transmission candidate positions from the LBT idle (or COT starting position) is used for transmission of PDSCH, DMRS, or the like.

Note that a case where the number of times by which each SSB index is actually transmitted in the SSB transmission duration is one (n=1) is illustrated here, but the present disclosure is not limited thereto.

(Third Aspect)

A third aspect controls reception processing of DL for an SSB transmission candidate position configured in an SSB transmission duration in which transmission of SSB is supported, based on control information transmitted from the base station.

Figure 6:
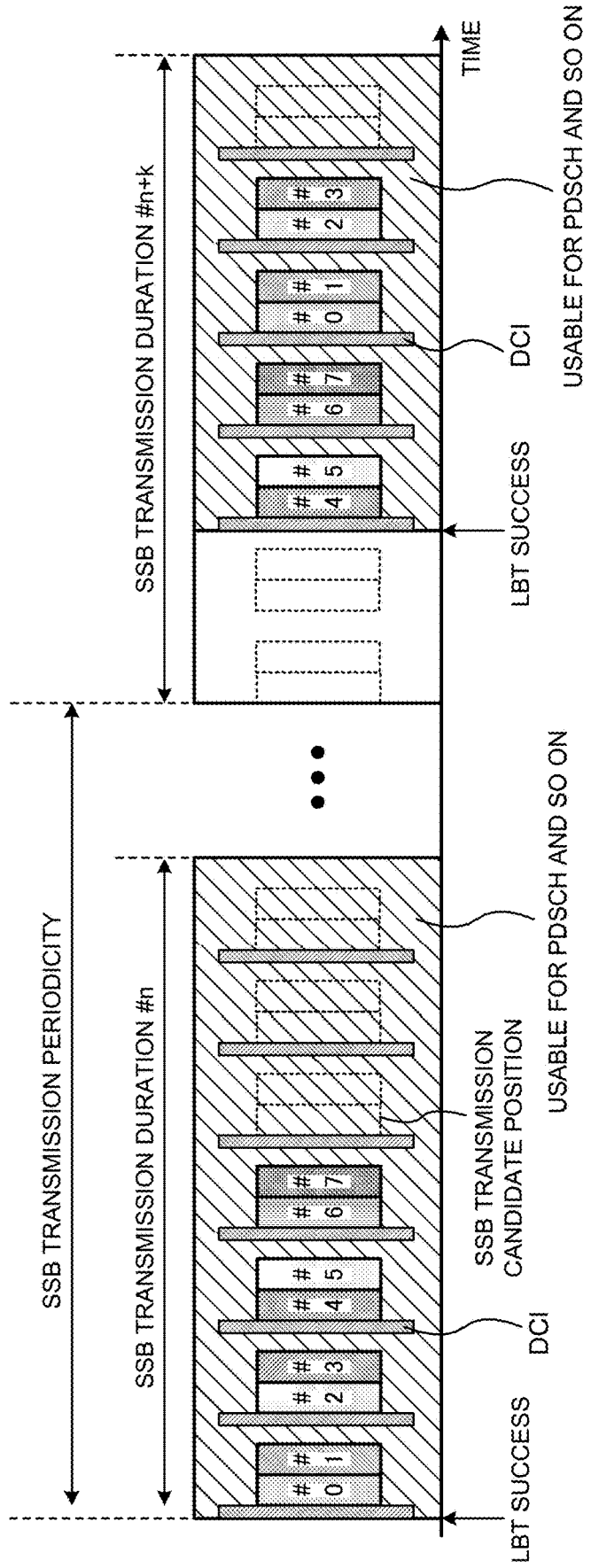
FIG. 6 is a diagram illustrating an example of transmission control of SSB according to a third aspect.

For example, the UE controls reception processing (for example, rate matching processing or puncture processing) for resources corresponding to each SSB transmission candidate position configured in the SSB transmission duration (or a given period) based on information transmitted in downlink control information (or PDCCH) (see FIG. 6). Alternatively, the UE may determine an SSB transmission candidate position to which PDSCH is allocated (or SSB is not transmitted) or an SSB transmission candidate position to which PDSCH is not allocated (or SSB is transmitted) and perform reception processing, based on information transmitted in downlink control information.

In FIG. 6, in an SSB transmission duration #n1, a case where LBT becomes idle in a head area of an SSB transmission duration (or an area before a head SSB transmission candidate area) is illustrated. In this case, the UE controls reception processing in resources corresponding to each SSB transmission candidate based on the DCI transmitted from the base station. For example, when the UE receives an instruction to perform rate matching in a resource corresponding to a given SSB transmission candidate position by the DCI (or receives an instruction indicating that PDSCH is not transmitted), the UE performs reception processing on the assumption that PDSCH is not transmitted in the resource.

On the other hand, when the UE does not receive an instruction to perform rate matching in a resource corresponding to a given SSB transmission candidate position by the DCI (or receives an instruction indicating that PDSCH is transmitted), the UE performs reception processing on the assumption that PDSCH is transmitted in the resource.

In an SSB transmission duration #n1+k, a case where LBT becomes idle in the middle of an SSB transmission duration (area between an SSB transmission candidate area corresponding to SSB #3 and an SSB transmission candidate area corresponding to SSB #4) is illustrated. Also in this case, the UE controls reception processing in resources corresponding to each SSB transmission candidate based on the DCI transmitted from the base station.

The base station may extend a given field (for example, rate matching indicator field) included in a given DCI format (for example, DCI format 1_1) and notify the UE of the presence or absence of rate matching for the resource corresponding to the SSB transmission candidate position. Further, the DCI may be transmitted for each given transmission unit (for example, slot, minislot, a given number of symbols, subframe, or the like). Further, a reception processing method of one SSB transmission candidate position may be designated using one DCI and a reception processing method of a plurality of SSB transmission candidate positions may be designated using one DCI.

As such, by designating a reception method of the SSB transmission candidate position using the DCI, it is possible to flexibly configure the resources corresponding to the SSB transmission candidate positions used for transmission of PDSCH or the like even when the plurality of SSB transmission candidate positions are configured in the SSB transmission duration. As a result, utilization efficiency of the resources can be improved.

<Variations>

The reception processing (for example, rate matching operation) for the SSB transmission candidate position may be changed (or switched) based on a given condition. The given condition may be, for example, at least one of a type of radio network temporary identifier (RNTI) applied to a CRC scramble of PDCCH (or DCI) that schedules PDSCH and a given field of DCI (for example, System information indicator). Note that the type of RNTI applied to the CRC scramble of the PDCCH (or DCI) may be a type of RTNI applied to PDSCH.

For example, when PDSCH is scheduled by PDCCH (or DCI) CRC-scrambled with SI-RNTI and SIB1 is transmitted by the PDSCH (PDSCH is RMSI), the UE cannot grasp in advance the number of SSBs that are actually transmitted. In this case, the UE may apply the reception processing shown in the first aspect.

Note that when SIB1 is transmitted by the PDSCH, a given field (for example, System information indicator) included in the DCI that schedules the PDSCH may be "0". That is, when the PDSCH is scheduled by the PDCCH (or DCI) CRC-scrambled by the SI-RNTI and a bit value of a given field contained in the DCI is "0", the UE may apply a reception method shown in the first aspect.

On the other hand, when the PDSCH is scheduled by the PDCCH (or DCI) CRC-scrambled by the SI-RNTI and a bit value of a given field contained in the DCI is "1", SIBs other than SIB1 are transmitted by the PDSCH. In this case, the UE can grasp information of SSBs that are transmitted (for example, at least one of the number of SSBs that are transmitted and transmission positions). For this reason, in this case, the UE may apply a reception method shown in the second aspect or the third aspect.

Further, when the PDSCH is scheduled by PDCCH (or DCI) CRC-scrambled by a RNTI other than SI-RNTI (for example, RA-RNTI, P-RNTI, or TC-RNTI, etc.), the UE can grasp the information of the SSBs that are transmitted (for example, at least one of the number of SSBs that are transmitted and the transmission positions). For this reason, in this case, the UE may apply a reception method shown in the second aspect or the third aspect.

As such, by changing and applying the reception method according to a situation, it is possible to flexibly control allocation of PDSCH and the like. As a result, utilization efficiency of the resources can be improved.

<Use of SSB Transmission Candidate Position>

The SSB transmission candidate positions configured within the SSB transmission duration (or a given period) may be used for retransmission or repetition of all SSBs transmitted within the SSB transmission duration. The base station may notify the UE of the presence or absence of retransmission or repetition using at least one of RRC signaling, MAC control information, and downlink control information. As a result, it becomes possible to secure a transmission opportunity of the SSB.

(Radio Communication System)

A configuration of a radio communication system according to an embodiment of the present disclosure is hereinafter described. In this radio communication system, communication is performed using one or a combination of the radio communication methods according to the embodiments of the present disclosure.

Figure 7:
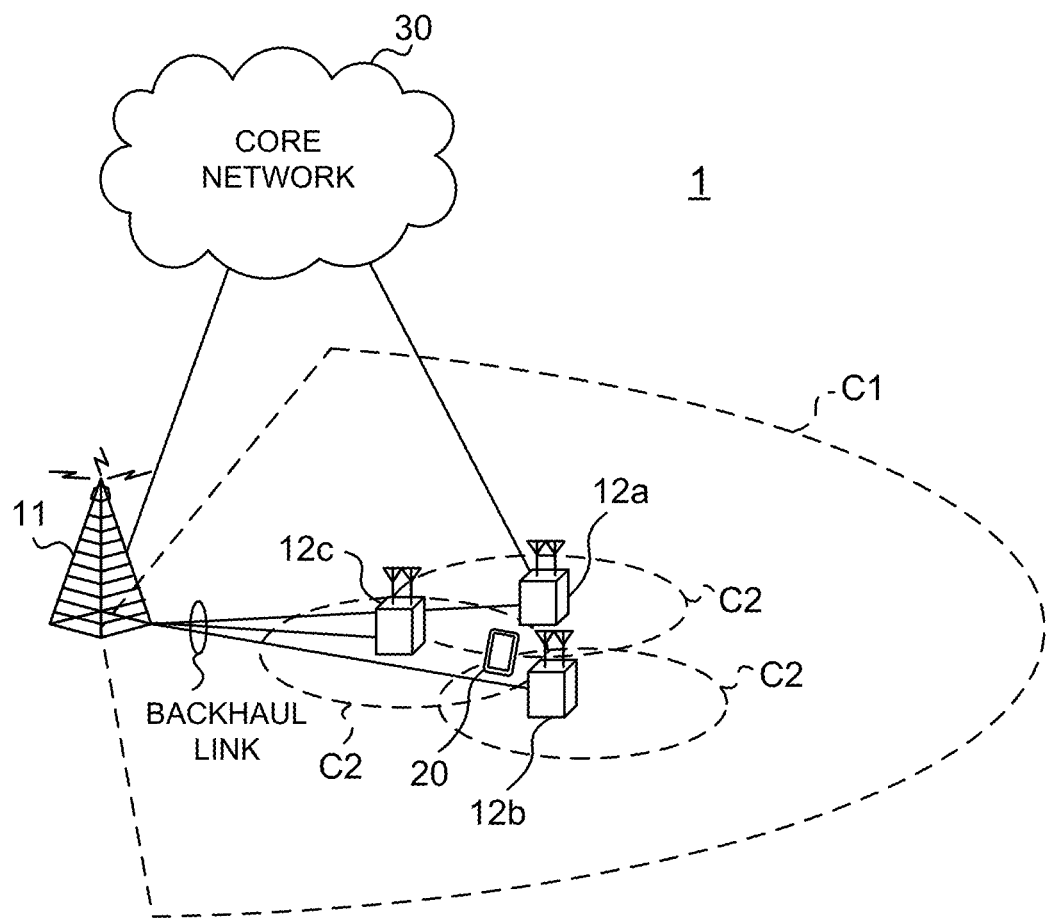
FIG. 7 is a diagram illustrating an example of a schematic configuration of a radio communication system according to an embodiment.

FIG. 7 is a diagram illustrating an example of a schematic configuration of a radio communication system according to an embodiment. A radio communication system 1 may be a system that implements communication using long term evolution (LTE), 5th generation mobile communication system new radio (5G NR), and the like specified by third generation partnership project (3GPP).

Further, the radio communication system 1 may support dual connectivity (multi-RAT dual connectivity (MR-DC)) between a plurality of RATS (Radio Access Technology). MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SN). In NE-DC, an NR base station (gNB) is MN, and an LTE (E-UTRA) base station (eNB) is SN.

The radio communication system 1 may support dual connectivity between a plurality of base stations in identical RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be located in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation and dual connectivity (DC) using a plurality of component carriers (CC).

Each CC may be included in at least one of a frequency range 1 (FR1) and a frequency range 2 (FR2). The macro cell C1 may be included in FR1, and the small cell C2 may be included in FR2. For example, FR1 may be a frequency band of 6 GHz or less (sub-6 GHz), and FR2 may be a frequency band higher than 24 GHz (above-24 GHz). Note that the frequency bands, definitions, and the like of FR1 and FR2 are not limited to these, and for example, FR1 may be a frequency band higher than FR2.

The user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

A base station 10 may be connected to a core network 30 via another base station 10 or directly. The core network 30 may include, for example, at least one of evolved packet core (EPC), 5G core network (5GCN), next generation core (NGC), and the like.

The user terminal 20 may correspond to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a physical downlink shared channel (PDSCH) shared by the user terminals 20, a physical broadcast channel (PBCH), a physical downlink control channel (PDCCH), or the like may be used.

In the radio communication system 1, as an uplink channel, a physical uplink shared channel (PUSCH) shared by the user terminals 20, a physical uplink control channel (PUCCH), a physical random access channel (PRACH), or the like may be used.

User data, higher layer control information and SIBs (System Information Blocks) are transmitted in the PDSCH. PUSCH may transmit user data, higher layer control information, and the like. PBCH may transmit master information block (MIB).

PDCCH may transmit lower layer control information. The lower layer control information may include, for example, downlink control information (DCI) including scheduling information of at least one of PDSCH and PUSCH.

Note that DCI that schedules PDSCH may be referred to as DL assignment, DL DCI, or the like, and DCI that schedules PUSCH may be referred to as UL grant, UL DCI, or the like. Note that PDSCH may be replaced with DL data, and PUSCH may be replaced with UL data.

A control resource set (CORESET) and a search space may be used to detect PDCCH. CORESET corresponds to a resource that searches for DCI. The search space corresponds to a search area and a search method for PDCCH candidates. One CORESET may be associated with one or more search spaces. UE may monitor CORESET associated with a certain search space based on search space configuration.

One SS may correspond to a PDCCH candidate corresponding to one or more aggregation levels. One or more search spaces may be referred to as a search space set. Note that "search space", "search space set", "search space configuration", "search space set configuration", "CORESET", "CORESET configuration", and the like in the present disclosure may be replaced with each other.

By means of PUCCH, channel state information (CSI), delivery confirmation information (for example, hybrid automatic repeat request acknowledgement (HARQ-ACK), which may be referred to as ACK/NACK or the like), scheduling request (SR), and the like may be transmitted. By means of PRACH, a random access preamble for establishing a connection with a cell may be transmitted.

Note that in the present disclosure, downlink, uplink, and the like may be expressed without "link". Various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SSB (SS Block), and the like. Note that SS, SSB, or the like may also be referred to as a reference signal.

In the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)".

(Base Station)

Figure 8:
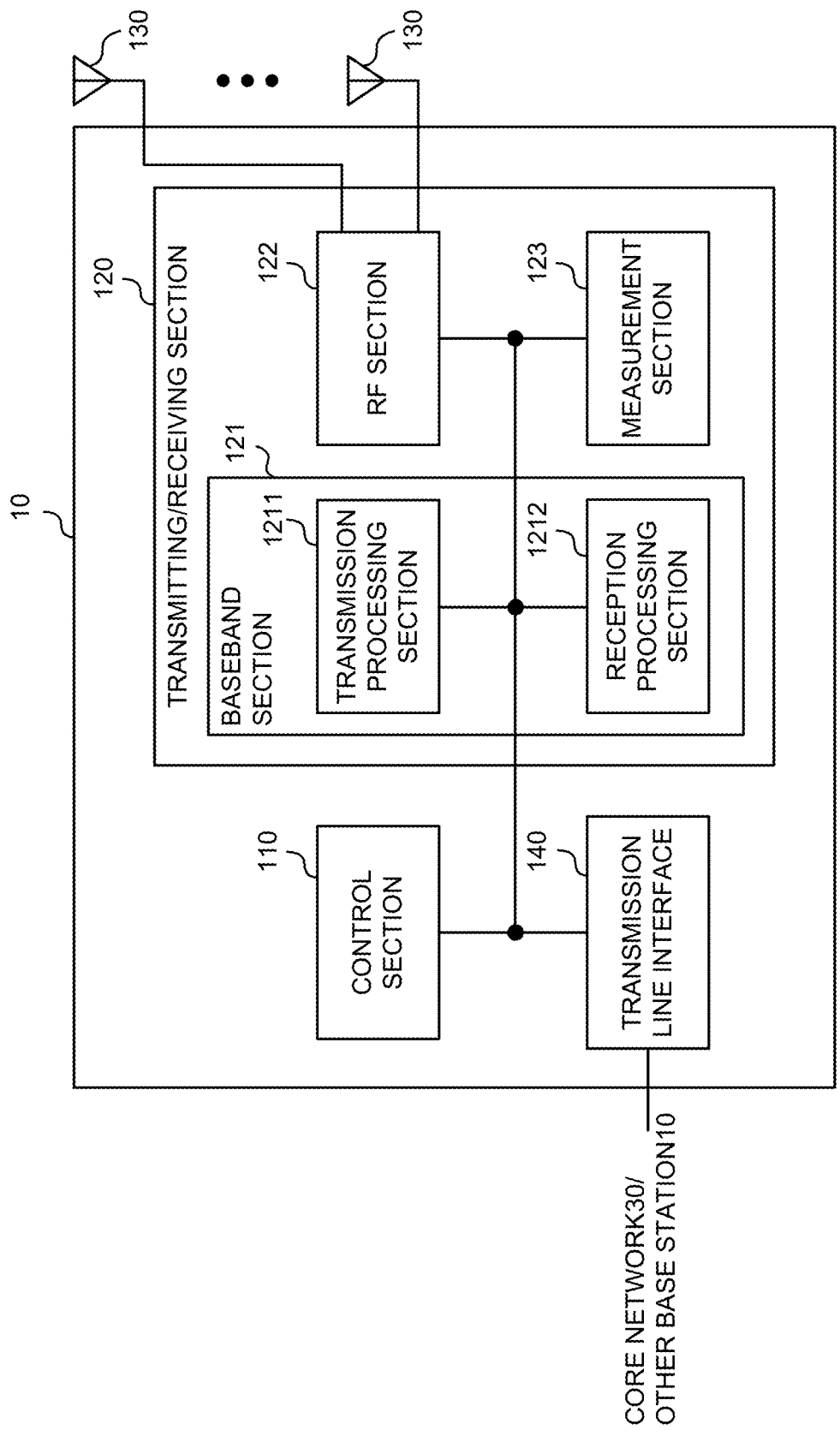
FIG. 8 is a diagram illustrating an example of a configuration of a base station according to an embodiment.

FIG. 8 is a diagram illustrating an example of a configuration of a base station according to an embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can be constituted by a controller, a control circuit, or the like, which is described based on common recognition in the technical field to which the present disclosure relates.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 120 may be constituted as an integrated transmitting/receiving section, or may be constituted by a transmitting section and a receiving section. The transmitting section may be constituted by the transmission processing section 1211 and the RF section 122. The receiving section may be constituted by the reception processing section 1212, the RF section 122, and the measurement section 123.

The transmission/reception antenna 130 can be constituted by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a transmission beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data acquired from the control section 110 or control information to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog transform on the bit string to be transmitted, and may output a baseband signal.

The transmitting/receiving section 120 (RF section 122) may perform modulation to a radio frequency band, filtering processing, amplification, and the like on the baseband signal, and may transmit a signal in the radio frequency band via the transmission/reception antenna 130.

Meanwhile, the transmitting/receiving section 120 (RF section 122) may perform amplification, filtering processing, demodulation to a baseband signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), signal to interference plus noise ratio (SINR), or signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be constituted by at least one of the transmitting/receiving section 120, the transmission/reception antenna 130, and the transmission line interface 140.

Note that the transmitting/receiving section 120 transmits at least one of a synchronization signal block (SSB) and a reference signal for measurement in a given period of a frequency domain to which listening is applied. Further, the transmitting/receiving section 120 may transmit information regarding an SSB transmission candidate position (for example, a correspondence relation between an SSB transmission candidate position index and an SSB index, or the like).

The control section 110 controls transmission of a DL signal based on a listening result in a given frequency domain. Further, when a physical downlink channel (PDCCH or PDSCH) or a demodulation reference signal of the physical downlink channel is transmitted in an SSB transmission duration, the control section 110 may control the transmission of the physical downlink channel or the demodulation reference signal in consideration of a transmission candidate position of at least one of the synchronization signal block and the reference signal for measurement.

(User Terminal)

Figure 9:
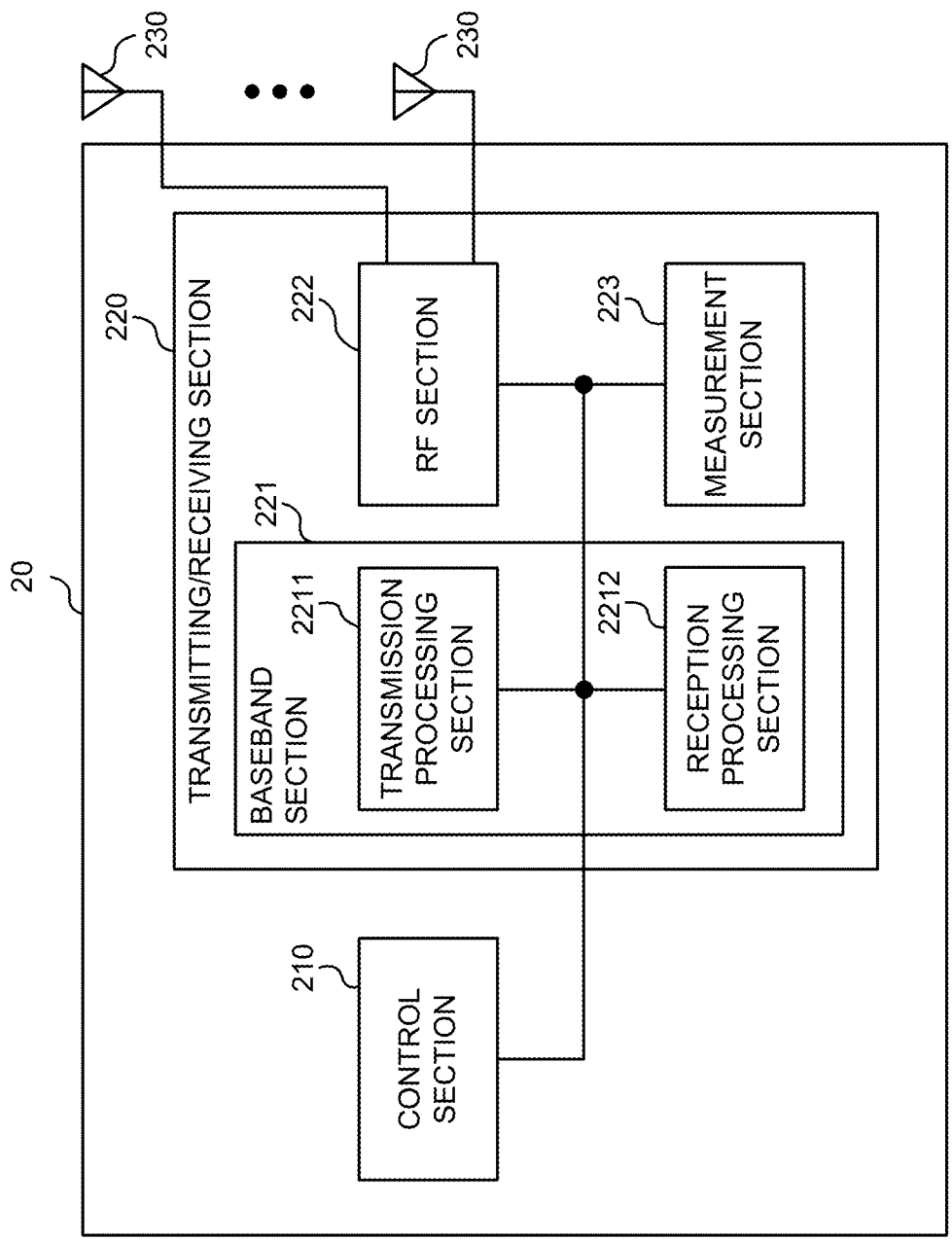
FIG. 9 is a diagram illustrating an example of a configuration of a user terminal according to an embodiment.

FIG. 9 is a diagram illustrating an example of a configuration of a user terminal according to an embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes a functional block which is a characteristic part of the present embodiment, it may be assumed that the user terminal 20 also has another functional block necessary for radio communication. A part of processing of each section described below may be omitted.

The control section 210 controls the entire user terminal 20. The control section 210 can be constituted by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted by a transmitter/receiver, an RF circuit, a baseband circuit, a filter, a phase shifter, a measurement circuit, a transmission/reception circuit, and the like, which are described based on common recognition in the technical field to which the present disclosure relates.

The transmitting/receiving section 220 may be constituted as an integrated transmitting/receiving section, or may be constituted by a transmitting section and a receiving section. The transmitting section may be constituted by the transmission processing section 2211 and the RF section 222. The receiving section may be constituted by the reception processing section 2212, the RF section 222, and the measurement section 223.

The transmission/reception antenna 230 can be constituted by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a transmission beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog transform on a bit string to be transmitted, and may output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) does not have to perform DFT processing as the transmission processing.

The transmitting/receiving section 220 (RF section 222) may perform modulation to a radio frequency band, filtering processing, amplification, and the like on the baseband signal, and may transmit a signal in the radio frequency band via the transmission/reception antenna 230.

Meanwhile, the transmitting/receiving section 220 (RF section 222) may perform amplification, filtering processing, demodulation to a baseband signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correction decoding), MAC layer processing, RLC layer processing, or PDCP layer processing on the acquired baseband signal.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may be constituted by at least one of the transmitting/receiving section 220, the transmission/reception antenna 230, and the transmission line interface 240.

Note that the transmitting/receiving section 220 receives at least one of a synchronization signal block and a reference signal for measurement in a given period of a frequency domain to which listening is applied. Further, the transmitting/receiving section 220 may receive information regarding an SSB transmission candidate position (for example, a correspondence relation between an SSB transmission candidate position index and an SSB index, or the like).

The control section 210 controls reception of a physical downlink channel based on a transmission candidate position of at least one of the synchronization signal block and the reference signal for measurement when the physical downlink channel is received in the given period. The control section 210 may control the reception on the assumption that the physical downlink channel is not transmitted in a resource corresponding to the transmission candidate position configured in the given period.

Further, the control section 210 may control the reception on the assumption that the physical downlink channel is transmitted in a first resource of resources corresponding to the transmission candidate positions configured in the given period or on the assumption that the physical downlink channel is not transmitted in a second resource of the resources.

For example, the control section 210 may determine at least one of the first resource and the second resource based on a transmission starting position in the given period and a transmission candidate position corresponding to at least one of each synchronization signal block index and each index of reference signal for measurement. Alternatively, the control section 210 may determine at least one of the first resource and the second resource based on information included in downlink control information.

(Hardware Configuration)

Note that the block diagrams that have been used to describe the above embodiments illustrate blocks in functional units. These functional blocks (configuration units) may be implemented in arbitrary combinations of at least one of hardware or software. Also, the method for implementing each functional block is not particularly limited. That is, each functional block may be achieved by a single device physically or logically aggregated, or may be achieved by directly or indirectly connecting two or more physically or logically separate devices (using wires, radio, or the like, for example) and using these plural devices. The functional block may be achieved by combining the one device or the plurality of devices with software.

Here, the functions include, but are not limited to, judging, determination, decision, calculation, computation, processing, derivation, investigation, search, confirmation, reception, transmission, output, access, solution, selection, choosing, establishment, comparison, assumption, expectation, deeming, broadcasting, notifying, communicating, forwarding, configuring, reconfiguring, allocating, mapping, assigning, and so on. For example, a functional block (configuration unit) that causes transmission to function may be called a transmitting unit, a transmitter, and the like. In any case, as described above, the implementation method is not particularly limited.

Figure 10:
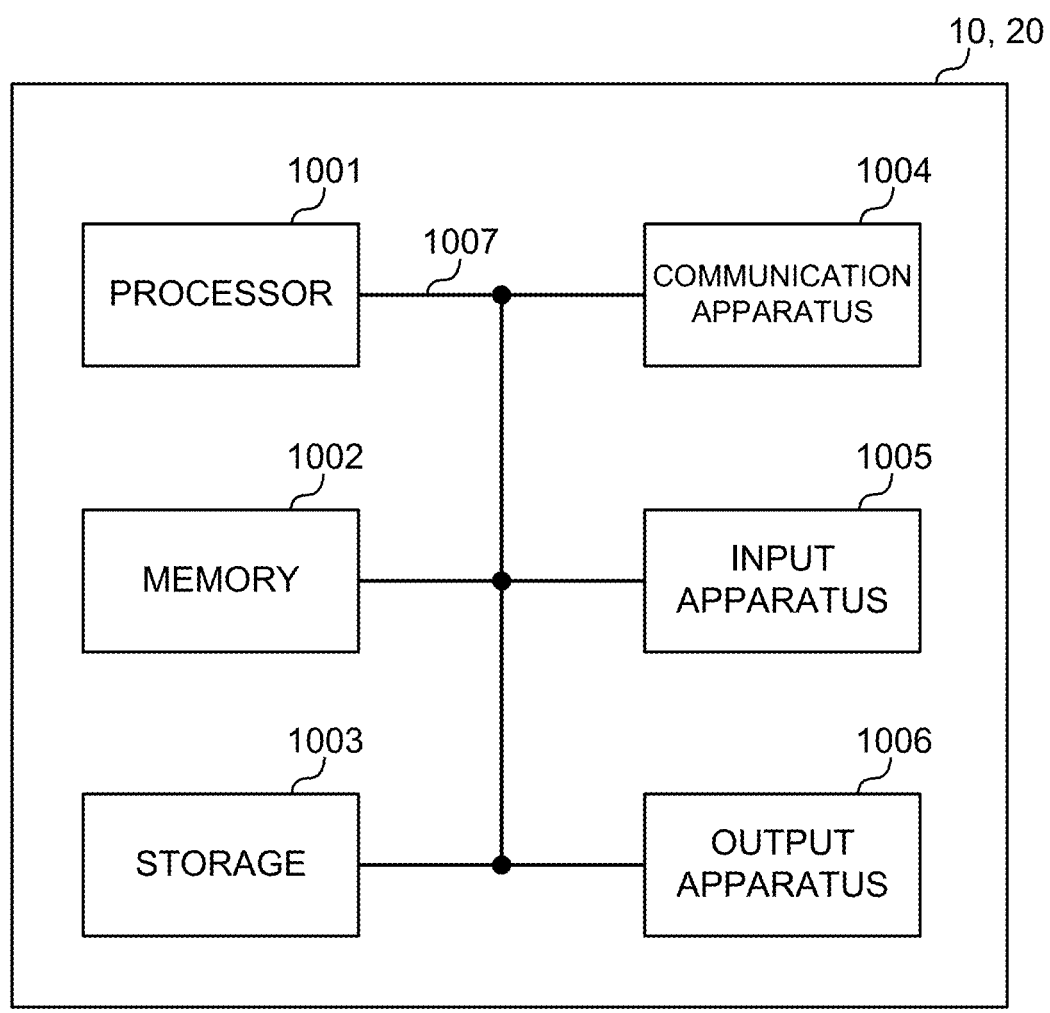
FIG. 10 is a diagram illustrating an example of a hardware configuration of the base station and the user terminal according to an embodiment.

For example, the base station, the user terminal, and so on according to an embodiment of the present disclosure may function as a computer that executes the processing of the radio communication method of the present disclosure. FIG. 10 is a diagram illustrating an example of a hardware configuration of the base station and the user terminal according to an embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the terms such as an apparatus, a circuit, an apparatus, a section, or a unit can be replaced with each other. The hardware configuration of the base station 10 and the user terminal 20 may be designed to include one or more of the apparatuses illustrated in the drawings, or may be designed not to include some apparatuses.

For example, although only one processor 1001 is shown, a plurality of processors may be provided. Furthermore, processes may be implemented with one processor, or processes may be implemented in parallel, in sequence, or in different manners, on two or more processors. Note that the processor 1001 may be implemented with one or more chips.

Each function of the base station 10 and the user terminal 20 is implemented by, for example, reading predetermined software (program) into hardware such as the processor 1001 and the memory 1002, and by controlling the operation in the processor 1001, the communication in the communication apparatus 1004, and at least one of the reading or writing of data in the memory 1002 and the storage 1003.

The processor 1001 may control the whole computer by, for example, running an operating system. The processor 1001 may be constituted by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Furthermore, the processor 1001 reads programs (program codes), software modules, data, and so on from at least one of the storage 1003 or the communication apparatus 1004 into the memory 1002, and executes various processing according to these. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and/or other appropriate storage media. The memory 1002 may be referred to as a "register", a "cache", a "main memory (primary storage apparatus)", and so on. The memory 1002 can store a program (program code), a software module, and the like, which are executable for implementing the radio communication method according to an embodiment of the present disclosure.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus".

The communication apparatus 1004 is hardware (transmitting/receiving device) for performing inter-computer communication via at least one of a wired network or a wireless network, and for example, is referred to as "network device", "network controller", "network card", "communication module", and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating the transmitting section 120*a* (220*a*) and the receiving section 120*b* (220*b*) from each other.

The input apparatus 1005 is an input device for receiving input from the outside (for example, a keyboard, a mouse, a microphone, a switch, a button, a sensor, and so on). The output apparatus 1006 is an output device for allowing sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002, and so on are connected by the bus 1007 so as to communicate information. The bus 1007 may be formed with a single bus, or may be formed with buses that vary between pieces of apparatus.

Also, the base station 10 and the user terminal 20 may be configured to include hardware such as a microprocessor, a digital signal processor (DSP), an application-specific integrated circuit (ASIC), a programmable logic device (PLD), a field programmable gate array (FPGA), and so on, and part or all of the functional blocks may be implemented by the hardware. For example, the processor 1001 may be implemented with at least one of these pieces of hardware.

(Variations)

Note that terms described in the present disclosure and terms necessary for understanding the present disclosure may be replaced with other terms that have the same or similar meanings. For example, a channel, a symbol, and a signal (or signaling) may be replaced with each other. The signal may be a message. A reference signal can be abbreviated as an "RS", and may be referred to as a "pilot", a "pilot signal", and so on, depending on which standard applies. Furthermore, a "component carrier (CC)" may be referred to as a "cell", a "frequency carrier", a "carrier frequency", and so on.

A radio frame may be formed with one or more durations (frames) in the time domain. Each of one or more periods (frames) constituting a radio frame may be referred to as a "subframe". Furthermore, a subframe may be formed with one or multiple slots in the time domain. A subframe may be a fixed time duration (for example, 1 ms) that is not dependent on numerology.

Here, the numerology may be a communication parameter used for at least one of transmission or reception of a certain signal or channel. For example, the numerology may indicate at least one of subcarrier spacing (SCS), a bandwidth, a symbol length, a cyclic prefix length, a transmission time interval (TTI), the number of symbols per TTI, a radio frame structure, specific filtering processing to be performed by a transceiver in the frequency domain, specific windowing processing to be performed by a transceiver in the time domain, and so on.

A slot may be formed with one or more symbols in the time domain (Orthogonal Frequency Division Multiplexing (OFDM) symbols, Single Carrier Frequency Division Multiple Access (SC-FDMA) symbols, or the like). Also, a slot may be a time unit based on numerology.

A slot may include a plurality of minislots. Each minislot may be formed with one or more symbols in the time domain. Also, a minislot may be referred to as a "subslot". Each minislot may be formed with fewer symbols than a slot. A PDSCH (or PUSCH) transmitted in a time unit larger than a minislot may be referred to as "PDSCH (PUSCH) mapping type A". A PDSCH (or PUSCH) transmitted using a minislot may be referred to as "PDSCH (PUSCH) mapping type B".

A radio frame, a subframe, a slot, a minislot and a symbol all represent the time unit in signal communication. A radio frame, a subframe, a slot, a minislot, and a symbol may be each called by other applicable names. Note that time units such as a frame, a subframe, a slot, a minislot, and a symbol in the present disclosure may be replaced with each other.

For example, one subframe may be referred to as "TTI", a plurality of consecutive subframes may be referred to as "TTI", or one slot or one mini slot may be referred to as "TTI". That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a "slot", a "mini slot", and so on, instead of a "subframe".

Here, a TTI refers to the minimum time unit of scheduling in radio communication, for example. For example, in LTE systems, the base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks, codewords, and so on, or may be the unit of processing in scheduling, link adaptation, and so on. Note that when TTI is given, a time interval (for example, the number of symbols) in which the transport blocks, the code blocks, the codewords, and the like are actually mapped may be shorter than TTI.

Note that, when one slot or one minislot is referred to as a "TTI", one or more TTIs (that is, one or multiple slots or one or more minislots) may be the minimum time unit of scheduling. Also, the number of slots (the number of minislots) to constitute this minimum time unit of scheduling may be controlled.

TTI having a period of 1 ms may be referred to as usual TTI (TTI in 3GPP Rel. 8 to 12), normal TTI, long TTI, a usual subframe, a normal subframe, a long subframe, a slot, or the like. A TTI that is shorter than the usual TTI may be referred to as "shortened TTI", "short TTI", "partial TTI" (or "fractional TTI"), "shortened subframe", "short subframe", "minislot", "sub-slot", "slot", or the like.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. The number of subcarriers included in the RB may be the same regardless of the numerology, and may be 12, for example. The number of subcarriers included in the RB may be determined based on numerology.

Also, an RB may include one or more symbols in the time domain, and may be one slot, one minislot, one subframe, or one TTI in length. One TTI, one subframe, and the like may be each formed with one or more resource blocks.

Note that one or more RBs may be referred to as a "physical resource block (PRB (Physical RB))", a "subcarrier group (SCG)", a "resource element group (REG)", a "PRB pair", an "RB pair", and so on.

Furthermore, a resource block may be comprised of one or more resource elements (REs). For example, one RE may be a radio resource field of one subcarrier and one symbol.

The bandwidth part (BWP) (which may be called partial bandwidth and the like) may represent a subset of consecutive common RB (common resource blocks) for a certain numerology in a certain carrier. Here, the common RB may be specified by the index of the RB based on a common reference point of the carrier. The PRB may be defined in a BWP and numbered within that BWP.

The BWP may include a BWP for UL (UL BWP) and a BWP for DL (DL BWP). For the UE, one or more BWPs may be configured within one carrier.

At least one of the configured BWPs may be active, and the UE does not need to assume to transmit or receive a predetermined signal/channel outside the active BWP. Note that "cell", "carrier", and the like in the present disclosure may be replaced with "BWP".

Note that the structures of radio frames, subframes, slots, minislots, symbols, and so on described above are merely examples. For example, configurations pertaining to the number of subframes included in a radio frame, the number of slots included in a subframe or a radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs), and so on can be variously changed.

Furthermore, the information and parameters described in the present disclosure may be represented in absolute values, represented in relative values with respect to given values, or represented using other corresponding information. For example, a radio resource may be specified by a predetermined index.

The names used for parameters and so on in the present disclosure are in no respect limiting. In addition, an equation and so on using these parameters may differ from those explicitly disclosed in the present disclosure. Since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and the like described in the present disclosure may be represented by using a variety of different technologies. For example, data, instructions, commands, information, signals, bits, symbols, and chips, all of which may be referenced throughout the herein-contained description, may be represented by voltages, currents, electromagnetic waves, magnetic fields or particles, optical fields or photons, or any combination of these.

Also, information, signals, and the like can be output at least either from higher layers to lower layers, or from lower layers to higher layers. Information, signals and so on may be input and output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The reporting of information is by no means limited to the aspects/embodiments described in the present disclosure, and may be performed using other methods. For example, notification of information in the present disclosure may be performed by using physical layer signaling (for example, downlink control information (DCI), uplink control information (UCI), higher layer signaling (for example, radio resource control (RRC) signaling, broadcast information (master information block (MIB), system information block (SIB), or the like), medium access control (MAC) signaling, another signal, or a combination thereof.

Note that physical layer signaling may be referred to as "L1/L2 (Layer 1/Layer 2) control information (L1/L2 control signals)", "L1 control information (L1 control signal)", and so on. Furthermore, the RRC signaling may be called an RRC message, and may be, for example, an RRC connection setup message, an RRC connection reconfiguration message, and the like. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software", "firmware", "middleware", "microcode", or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSLs), and the like) or wireless technologies (infrared radiation, microwaves, and the like), at least one of these wired technologies or wireless technologies are also included in the definition of communication media.

The terms "system" and "network" used in the present disclosure may be used interchangeably. The "network" may mean an apparatus (for example, a base station) included in the network.

In the present disclosure, terms such as "precoding", "precoder", "weight (precoding weight)", "quasi-Co-Location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" may be used interchangeably. The base station may be called a term such as a macro cell, a small cell, a femto cell, a pico cell, and the like.

A base station can accommodate one or more (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to all or part of the coverage area of at least one of a base station or a base station subsystem that provides communication services within this coverage.

In the present disclosure, the terms "mobile station (MS)", "user terminal", "user equipment (UE)", "terminal", and the like may be used interchangeably.

A mobile station may be referred to as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of a base station or a mobile station may be referred to as a transmitting apparatus, a receiving apparatus, a radio communication apparatus, or the like. Note that at least one of the base station and mobile station may be a device mounted on a moving body, a moving body itself, and the like. The moving body may be a transportation (for example, a car, an airplane and so on), an unmanned moving body (for example, a drone, an autonomous car, and so on), or a (manned or unmanned) robot. Note that at least one of the base station or the mobile station also includes a device that does not necessarily move during a communication operation. For example, at least one of the base station or the mobile station may be an IoT (Internet of Things) device such as a sensor.

Furthermore, the base stations in the present disclosure may be replaced with the user terminal. For example, each aspect/embodiment of the present disclosure may be applied to a structure in which communication between the base station and the user terminal is replaced with communication among a plurality of user terminals (which may be referred to as, for example, D2D (Device-to-Device), V2X (Vehicle-to-Everything), and so on). In this case, the user terminal 20 may be configured to have the functions of the base station 10 described above. In addition, the wording such as "up" and "down" may be replaced with the wording corresponding to the terminal-to-terminal communication (for example, "side"). For example, an uplink channel and a downlink channel may be replaced with a side channel.

Likewise, the user terminal in the present disclosure may be replaced with a base station. In this case, the base station 10 may be configured to have the functions of the user terminal 20 described above.

Certain actions that have been described in the present disclosure to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, regarding the methods described in the present disclosure, elements of various steps are presented using an illustrative order, and are not limited to the presented particular order.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New Radio Access Technology (New-RAT), New Radio (NR), New radio access (NX), Future generation radio access (FX), Global System for Mobile communications (GSM; registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, and/or next generation systems or the like that are enhanced based on these. Further, a plurality of systems may be combined and applied (for example, a combination of LTE or LTE-A and 5G, and the like).

The phrase "based on" as used in the present disclosure does not mean "based only on", unless otherwise specified.

In other words, the phrase "based on" means both "based only on" and "based at least on".

Reference to elements with designations such as "first", "second", and so on as used in the present disclosure does not generally limit the number/quantity or order of these elements. These designations may be used in the present disclosure only for convenience, as a method for distinguishing between two or more elements. In this way, reference to the first and second elements does not imply that only two elements may be employed, or that the first element must precede the second element in some way.

The terms "judging (determining)" as used in the present disclosure may encompass a wide variety of actions. For example, "judging (determining)" may be interpreted to mean making judgements and determinations related to judging, calculating, computing, processing, deriving, investigating, looking up, search, inquiry (for example, looking up in a table, database, or another data structure), ascertaining, and so on.

Furthermore, to "judge" and "determine" as used herein may be interpreted to mean making judgements and determinations related to receiving (for example, receiving information), transmitting (for example, transmitting information), inputting, outputting, accessing (for example, accessing data in a memory), and so on.

In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

In addition, to "judge (determine)" may be replaced with "assuming", "expecting", "considering", and so on.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in the radio frequency, microwave, and optical (both visible and invisible) regions, or the like.

In the present disclosure, the phrase "A and B are different" may mean "A and B are different from each other". Note that the term may mean that "A and B are each different from C". The terms such as "leave", "coupled", and the like may be interpreted as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although the invention according to the present disclosure has been described in detail above, it is obvious to a person skilled in the art that the invention according to the present disclosure is by no means limited to the embodiments described in the present disclosure. The invention according to the present disclosure can be implemented with corrections and modifications, without departing from the spirit and scope of the invention defined by the recitations of claims. Consequently, the description of the present disclosure is provided for the purpose of exemplification and explanation, and has no limitative meaning to the invention according to the present disclosure.

The invention claimed is:

1. A terminal comprising:
   a receiver that receives a configuration for a synchronization signal/physical broadcast channel (SS/PBCH) block transmission candidate position in a transmission duration in which one or more SS/PBCH blocks are transmitted in an unlicensed spectrum, wherein the SS/PBCH block transmission candidate position corresponds to an SS/PBCH block index; and
   a processor that controls, based on the configuration, reception of a physical downlink shared channel, assuming that the physical downlink shared channel is not mapped to a resource corresponding to the SS/PBCH block transmission candidate position regardless of whether or not the one or more SS/PBCH blocks are transmitted in the resource,
   wherein a number of SS/PBCH blocks with a given SS/PBCH block index transmitted in the transmission duration is not larger than one.

2. The terminal according to claim 1, wherein the receiver receives, by using higher layer signaling, a configuration for the transmission duration.

3. The terminal according to claim 1, wherein a plurality of SS/PBCH block transmission candidate positions corresponding to the given SS/PBCH block index is configured in the transmission duration.

4. The terminal according to claim 1, wherein the resource is a physical resource block including the SS/PBCH block transmission candidate position.

5. A radio communication method for a terminal, comprising:
   receiving a configuration for a synchronization signal/physical broadcast channel (SS/PBCH) block transmission candidate position in a transmission duration in which one or more SS/PBCH blocks are transmitted in an unlicensed spectrum, wherein the SS/PBCH block transmission candidate position corresponds to an SS/PBCH block index; and
   controlling, based on the configuration, reception of a physical downlink shared channel, assuming that the physical downlink shared channel is not mapped to a resource corresponding to the SS/PBCH block transmission candidate position regardless of whether or not the one or more SS/PBCH blocks are transmitted in the resource,
   wherein a number of SS/PBCH blocks with a given SS/PBCH block index transmitted in the transmission duration is not larger than one.

6. A base station comprising:
   a transmitter that transmits a configuration for a synchronization signal/physical broadcast channel (SS/PBCH) block transmission candidate position in a transmission duration in which one or more SS/PBCH blocks are transmitted in an unlicensed spectrum, wherein the SS/PBCH block transmission candidate position corresponds to an SS/PBCH block index; and a processor that controls, by using the configuration, so that a physical downlink shared channel is not mapped to a resource corresponding to the SS/PBCH block transmission candidate position regardless of whether or not the one or more SS/PBCH blocks are transmitted in the resource, wherein a number of SS/PBCH blocks with a given SS/PBCH block index transmitted in the transmission duration is not larger than one.

7. A system comprising a base station and a terminal, wherein the base station comprises:

a transmitter that transmits a configuration for a synchronization signal/physical broadcast channel (SS/PBCH) block transmission candidate position in a transmission duration in which one or more SS/PBCH blocks are transmitted in an unlicensed spectrum, wherein the SS/PBCH block transmission candidate position corresponds to an SS/PBCH block index; and a processor that controls, by using the configuration, so that a physical downlink shared channel is not mapped to a resource corresponding to the SS/PBCH block transmission candidate position regardless of whether or not the one or more SS/PBCH blocks are transmitted in the resource, and the terminal comprises:

a receiver that receives the configuration; and a processor that controls, based on the configuration, reception of the physical downlink shared channel, assuming that the physical downlink shared channel is not mapped to the resource regardless of whether or not the one or more SS/PBCH blocks are transmitted in the resource, wherein a number of SS/PBCH blocks with a given SS/PBCH block index transmitted in the transmission duration is not larger than one.

* * * * *